US012728674B2

(12) United States Patent
Bortolet et al.

(10) Patent No.: US 12,728,674 B2
(45) Date of Patent: Sep. 8, 2026

(54) TIRE TREAD WITH A BOTTOM GROOVE AND A REINFORCING STRUCTURE WITH ANGLES

(71) Applicant: The Goodyear Tire & Rubber Company, Akron, OH (US)

(72) Inventors: Lionel Jean-Marie Bortolet, Colmar-Berg (LU); Julien Caroux, Colmar-Berg (LU); Dorian Boluix, Colmar-Berg (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 18/800,374

(22) Filed: Aug. 12, 2024

(65) Prior Publication Data

US 2026/0042320 A1 Feb. 12, 2026

(51) Int. Cl.
*B60C 11/13* (2006.01)
*B29D 30/06* (2006.01)
(Continued)

(52) U.S. Cl.
CPC ...... *B60C 11/1307* (2013.01); *B29D 30/0606* (2013.01); *B29D 2030/0613* (2013.01); (Continued)

(58) Field of Classification Search
CPC ......... B60C 11/0302; B60C 2011/1338; B60C 11/0323; B60C 11/1369
See application file for complete search history.

(56) References Cited

U.S. PATENT DOCUMENTS 4,230,512 A * 10/1980 Makino ............... B60C 11/0309 152/209.27
D761,197 S 7/2016 Dixon et al.
(Continued)

FOREIGN PATENT DOCUMENTS

DE 69823715 T2 5/2005
DE 102020212560 A1 4/2022
(Continued)

OTHER PUBLICATIONS

Extended European Search Report for Application No. 25191585.6, dated Jan. 1, 2026.

*Primary Examiner* — Robert C Dye
(74) *Attorney, Agent, or Firm* — Eryn A. Fuhrer

(57) ABSTRACT

A tire tread comprising: a first tread element with a first radially outermost surface, a second tread element with a second radially outermost surface, a groove between the first tread element and the second tread element. The groove comprises a first section with a side surface which is inclined with respect to the first radially outermost surface of a first inclination angle; and a second section comprising a radially outermost portion with an inclined surface which is inclined with respect to the first radially outermost surface of a second inclination angle. The latter is narrower than the first inclination angle. The first inclination angle and the second inclination angle exhibit an inclination difference ranging from 20° to 80°. The second section comprises a radially innermost portion with a passage, a slit portion connecting the radially innermost portion to the radially outermost portion. The slit portion is narrower than the passage.

13 Claims, 8 Drawing Sheets

(51) Int. Cl.
*B60C 11/03* (2006.01)
*B60C 11/12* (2006.01)

(52) U.S. Cl.
CPC ................. *B60C 2011/0346* (2013.01); *B60C 2011/0348* (2013.01); *B60C 2011/1254* (2013.01); *B60C 2011/1338* (2013.01); *B60C 2200/06* (2013.01)

(56) References Cited

U.S. PATENT DOCUMENTS

| | | | |
|---|---|---|---|
| D823,782 | S | 7/2018 | Bortolet et al. |
| D834,511 | S | 11/2018 | Wang et al. |
| D845,222 | S | 4/2019 | Wu |
| D849,669 | S | 5/2019 | Reygrobellet et al. |
| D858,427 | S | 9/2019 | Kochanek |
| D886,033 | S | 6/2020 | Kristen |
| D886,727 | S | 6/2020 | Bortolet et al. |
| D956,671 | S | 7/2022 | Koguma |
| D1,003,811 | S | 11/2023 | Zhao et al. |
| D1,003,815 | S | 11/2023 | Guilford et al. |
| D1,012,828 | S | 1/2024 | Fujioka |
| D1,044,698 | S | 10/2024 | Fujioka |
| D1,080,518 | S | 6/2025 | Guilford et al. |
| D1,083,758 | S | 7/2025 | Montgomery, Jr. et al. |
| D1,104,936 | S | 12/2025 | Bortolet et al. |
| 2008/0047641 | A1 * | 2/2008 | Takahashi ........... B60C 11/0309 152/209.3 |
| 2018/0170116 | A1 * | 6/2018 | Daries ..................... B60C 11/13 |
| 2019/0232722 | A1 * | 8/2019 | Becker ................ B60C 11/1353 |
| 2020/0070586 | A1 * | 3/2020 | Ocana Amezcua ... B60C 11/045 |
| 2024/0025213 | A1 | 1/2024 | Eikermann |
| 2024/0092126 | A1 | 3/2024 | Neau |

FOREIGN PATENT DOCUMENTS

| | | | | |
|---|---|---|---|---|
| DE | 102022117024 | A1 | 1/2023 | |
| EP | 0206227 | A2 | 12/1986 | |
| EP | 3321103 | B1 | 7/2019 | |
| EP | 3334612 | B1 | 7/2019 | |
| EP | 3521067 | B1 | 12/2021 | |
| EP | 4134250 | B1 | 1/2024 | |
| EP | 4303037 | A1 * | 1/2024 | ......... B60C 11/1315 |
| FR | 2971732 | A1 | 8/2012 | |
| FR | 3049899 | A1 | 10/2017 | |
| WO | 2017174927 | A1 | 10/2017 | |
| WO | 2020030667 | A1 | 2/2020 | |
| WO | 2020120881 | A1 | 6/2020 | |

* cited by examiner

TIRE TREAD WITH A BOTTOM GROOVE AND A REINFORCING STRUCTURE WITH ANGLES

FIELD OF THE INVENTION

The present invention relates generally to vehicle tires and, more specifically, to a tread pattern for commercial truck applications.

BACKGROUND OF THE INVENTION

Conventional commercial truck tires are required to provide a suitable level of wet and snow performance while rolling resistance performance and fuel mileage efficiency achieved by the tire are at least maintained. Moreover, it is desired that such tires provide a high level of cornering stiffness and resistance to tread wear in order to prolong the useful life of the tire tread. Accordingly, there is a need for a commercial truck tire having a tread pattern that functionally meets such competing objectives, such as snow grip performance, to thereby provide the commercial truck user with acceptable overall tire performance.

The document EP3521067A1 discloses a tire tread having a circumferential center rib and a circumferential intermediate rib laterally adjacent the center rib. The intermediate rib is separated from the center rib by a first circumferential groove, a second circumferential groove bordering the intermediate rib opposite the first circumferential groove. The tread further includes two further circumferential grooves and at least one stiffener element disposed within each of the four circumferential grooves, the stiffener elements having a reduced height relative to a height of the center rib and the intermediate ribs and having a circumferentially oriented cut extending into an upper surface of the stiffener element and toward a bottom of the stiffener element. The cut extends circumferentially through the stiffener element.

The document DE102022117024A1 discloses a tire having both low rolling resistance performance and wet performance. In the tire, the ratio of the grounding width Wce of a center land part to a tire grounding width TW is in a range of 0.55≤Wce/TW≤0.70. The center land part comprises a plurality of first center lug grooves which open on a first circumferential main groove. The second center lug grooves open on a second circumferential main groove in one end part and extend in the tire width direction to cross the tire equator face. Besides, the first and second center lug grooves have the S-shaped forms in the area from the tire equator face. Further, the S-shaped form becomes convex toward a tire rotation direction on the tire equator face and becomes convex toward a tire reversal direction on one end part.

The document US2024025213A1 discloses a pneumatic vehicle tire comprising: a tread having a profiling with a first circumferential groove and a second circumferential groove formed to a profile depth. The first and second grooves have alternating sections over a circumference of the pneumatic vehicle tire.

The document EP4134250A1 discloses a tire comprising a tread portion. The tread portion includes a plurality of circumferential grooves extending continuously in a tire circumferential direction. The circumferential grooves include a pair of shoulder circumferential grooves, and at least one middle circumferential groove disposed between the pair of shoulder circumferential grooves. A groove depth of the middle circumferential groove is less than a groove depth of each of the shoulder circumferential grooves. In a groove bottom of the middle circumferential groove, a circumferential sipe extending inwardly from the groove bottom in a tire radial direction, and a circumferential width-increased portion extending inwardly from the circumferential sipe, are formed.

SUMMARY OF THE INVENTION

The invention relates to a tire tread in accordance with the claims.

Dependent claims refer to preferred embodiments of the invention.

A first tire tread in accordance with a preferred aspect of the present invention includes: a first tread element with a first radially outermost surface, a second tread element with a second radially outermost surface, a groove between the first tread element and the second tread element, said groove comprising a first section and a second section; the first section comprises a side surface which extends from the first radially outermost surface and which is inclined with respect to the first radially outermost surface of a first inclination angle; the second section comprises: a radially outermost portion with an inclined surface, which is inclined with respect to the first radially outermost surface of a second inclination angle, which is narrower than the first inclination angle, the first inclination angle and the second inclination angle exhibiting an inclination difference ranging from 20° to 80°; a radially innermost portion with a passage extending toward the first section, a slit portion radially connecting the radially innermost portion to the radially outermost portion, said slit portion being narrower than the passage.

According to another preferred aspect of the first tire tread, the groove is a first groove, the tire tread further comprises: a third tread element; a circumferential groove between the first tread element and the third tread element; each of the first tread element and the third tread element comprises a groove surface demarcating the circumferential groove, each groove surface comprising two protrusions and a recess between the two protrusions, one of the two protrusions of the first tread element axially projecting within the recess of the third tread element.

According to still another preferred aspect of the first tire tread, the inclination difference ranges from 45° to 70° and the second inclination angle ranges from 5° to 30°.

According to yet another preferred aspect of the first tire tread, the groove comprises a bottom portion joined to the side surface, the passage comprises a passage bottom, the bottom portion extending radially inward the passage bottom.

According to still another preferred aspect of the first tire tread, the groove comprises a bottom portion joined to the side surface; the passage comprises a passage width, the bottom portion comprises a bottom width radially level the passage, said bottom width being wider than the passage width.

According to yet another preferred aspect of the first tire tread, the groove is a circumferential groove; the first section comprises a plurality of first sections, and the second section comprises a plurality of second sections, said first sections and said second sections defining an alternation along a circumferential direction of the tire tread.

According to still another preferred aspect of the first tire tread, the first section comprises a first maximum width radially level with the first radially outermost surface, and the second section comprises a second maximum width radially level with the first radially outermost surface, the second maximum width is narrower equal to the first maximum width.

According to yet another preferred aspect of the first tire tread, the first tread element comprises a circumferential row of first tread blocks, at least one of said first tread blocks extends along each of the first section and the second section, the second tread element comprises an inclined surface which extends from the second radially outermost surface and which is symmetrical to the inclined surface of the first tread element.

According to still another preferred aspect of the first tire tread, the groove comprises a groove maximum width radially level the first radially outermost surface and the second radially outermost surface, said first maximum width ranges from 8 mm to 10 mm, and the passage comprises a cylindrical shape.

A second tire tread in accordance with a preferred aspect of the present invention includes: a first tread element with a first radially outermost surface; a second tread element; a third tread element; a first groove between the first tread element and the second tread element, said first groove comprising a first section and a second section; the first section comprises a side surface which is inclined with respect to the first radially outermost surface of a first inclination angle; the second section comprises: a radially outermost portion with an inclined surface, which is inclined with respect to the first radially outermost surface of a second inclination angle, which is narrower than the first inclination angle, the first inclination angle and the second inclination angle exhibiting an inclination difference ranging from 20° to 80°; a radially innermost portion with a passage extending toward the first section; a slit portion radially connecting the radially innermost portion to the radially outermost portion, said slit portion being narrower than the passage.

According to still another preferred aspect of the second tire tread, a circumferential groove between the first tread element and the third tread element, the circumferential groove comprising first bends and second bends forming an alternation.

According to yet another preferred aspect of the second tire tread, each of the first tread element and the third tread element comprises a groove surface demarcating the circumferential groove, each groove surface comprising two protrusions and a recess between the two protrusions, one of the two protrusions of the first tread element axially projecting within the recess of the third tread element.

According to still another preferred aspect of the second tire tread, the tire tread comprises a fourth tread element identical to the third tread element, the groove surfaces of the third tread element and the fourth tread element form an interface recess, the other of the two protrusions of said first tread element axially projecting within said interface recess.

According to yet another preferred aspect of the second tire tread, the third tread element comprises an element offset with respect to the first tread element, and a protrusion offset between the two protrusions, said protrusion offset being twice as long as the element offset.

According to still another preferred aspect of the second tire tread, the circumferential groove is an equatorial circumferential groove, the tire tread further comprising a third groove; the equatorial circumferential groove being axially between the first groove and the third groove.

According to yet another preferred aspect of the second tire tread, the first tread element comprises an opposite surface axially opposite to the groove surface, the opposite surface comprises a first protrusion number, and the groove surface comprises a second protrusion number which is at least twice as high than the first protrusion number.

According to still another preferred aspect of the second tire tread, the circumferential groove comprises a groove axial width, and the two protrusions comprise a protrusion axial width which is larger than the groove axial width.

A first tire tread mold in accordance with a preferred aspect of the present invention includes a first cavity with a first radially outermost surface for forming a first tread element of a tire; a second cavity with a second radially outermost surface for forming a second tread element of said tire; a main separation wall between the first cavity and the second cavity for forming a groove between the first tread element and the second tread element; the main separation wall comprising: a first mold section with a mold side surface which extends from the first radially outermost surface, which is inclined with respect to the first radially outermost surface of a first inclination angle; a second mold section which comprises: a radially outermost portion with a mold inclined surface, which is inclined with respect to the first radially outermost surface of a second inclination angle, which is narrower than the first inclination angle, the first inclination angle and the second inclination angle exhibiting an inclination difference ranging from 20° to 80°; a radially innermost portion with a rod extending toward the first mold section; a connecting portion radially connecting the radially innermost portion to the radially outermost portion, said connecting portion being narrower than the rod.

According to still another preferred aspect of the first tire tread mold, the tire tread mold comprises a separating blade forming the second mold section, said separating blade comprises: a cylindrical portion forming the radially innermost portion, a partition wall with at least one vent radially at the opposite of the cylindrical portion, said partition wall forming the connecting portion.

According to yet another preferred aspect of the first tire tread mold, the first radially outermost surface comprises a radial vent, the separating blade comprises a blade vent inclined with respect to the radial vent, the radial vent comprises a first diameter, the blade vent comprises a second diameter which is narrower than the first diameter.

According to still another preferred aspect of the first tire tread mold, the first radially outermost surface comprises a first vent gap along the mold inclined surface, a second vent gap at distance from the mold inclined surface; the second vent gap being smaller than the first vent gap.

According to yet another preferred aspect of the first tire tread mold, the first radially outermost surface comprises a radial vent row along the mold inclined surface, said mold inclined surface being airtight.

Definitions

"Carcass" means the tire structure apart from the belt structure, tread, undertread, and sidewall rubber over the plies, but including the beads.

"Equatorial plane (EP)" means the plane perpendicular to the tire's axis of rotation and passing through the center of its tread.

"Groove" means an elongated void area in a tread that may extend circumferentially or laterally about the tread in a straight, curved, or zig-zag manner. Circumferentially and laterally extending grooves sometimes have common portions and may be subclassified as "wide", "narrow", or "slot". In the appended drawings, slots are illustrated by single lines because they are so narrow. Grooves generally remain open in a tie footprint.

"Sipes" refer to small slots molded into ribs of tire that subdivides the tread surface and improves traction characteristics. Sipes generally close in a tire footprint.

"Net-to-gross" refers to the ratio of the ground contacting surface of a tread to the total tread area.

"Open-angle" refers to a groove wall angle which causes the groove to be wider at the top as compared to its width at the tread base.

"Pitch" refers to the distance from one peak in the tread pattern to the next.

"Pneumatic tire" means a laminated mechanical device of generally toroidal shape (usually an open-torus) having beads and a tread and made of rubber, chemicals, fabric, steel, or other materials. When mounted on the wheel of a motor vehicle, the tire through its tread provides traction and contains the fluid that sustains the vehicle load.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Tread" means a molded rubber component which, when bonded to a tire casing, includes that portion of the tire that comes into contact with the road when the tire is normally inflated and under normal load.

"Tread element" or "traction element" means a rib or a block element.

BRIEF DESCRIPTION OF THE DRAWINGS

The invention will be described by way of example and with reference to the accompanying drawings in which.

DETAILED DESCRIPTION OF THE INVENTION

Figure 1:
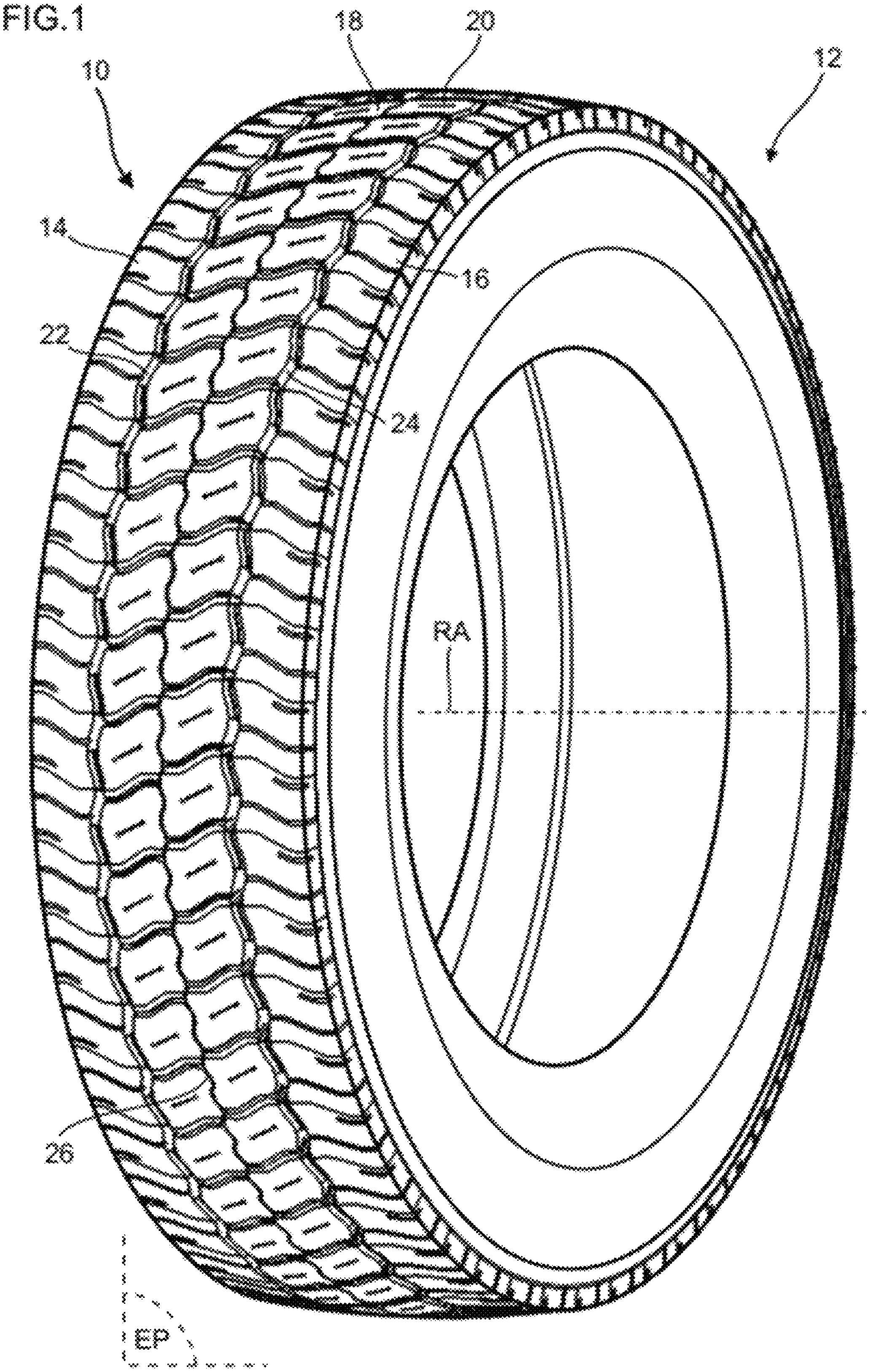
FIG. 1 is a perspective view of a tire with a tire tread in accordance with the invention.
Figure 2:
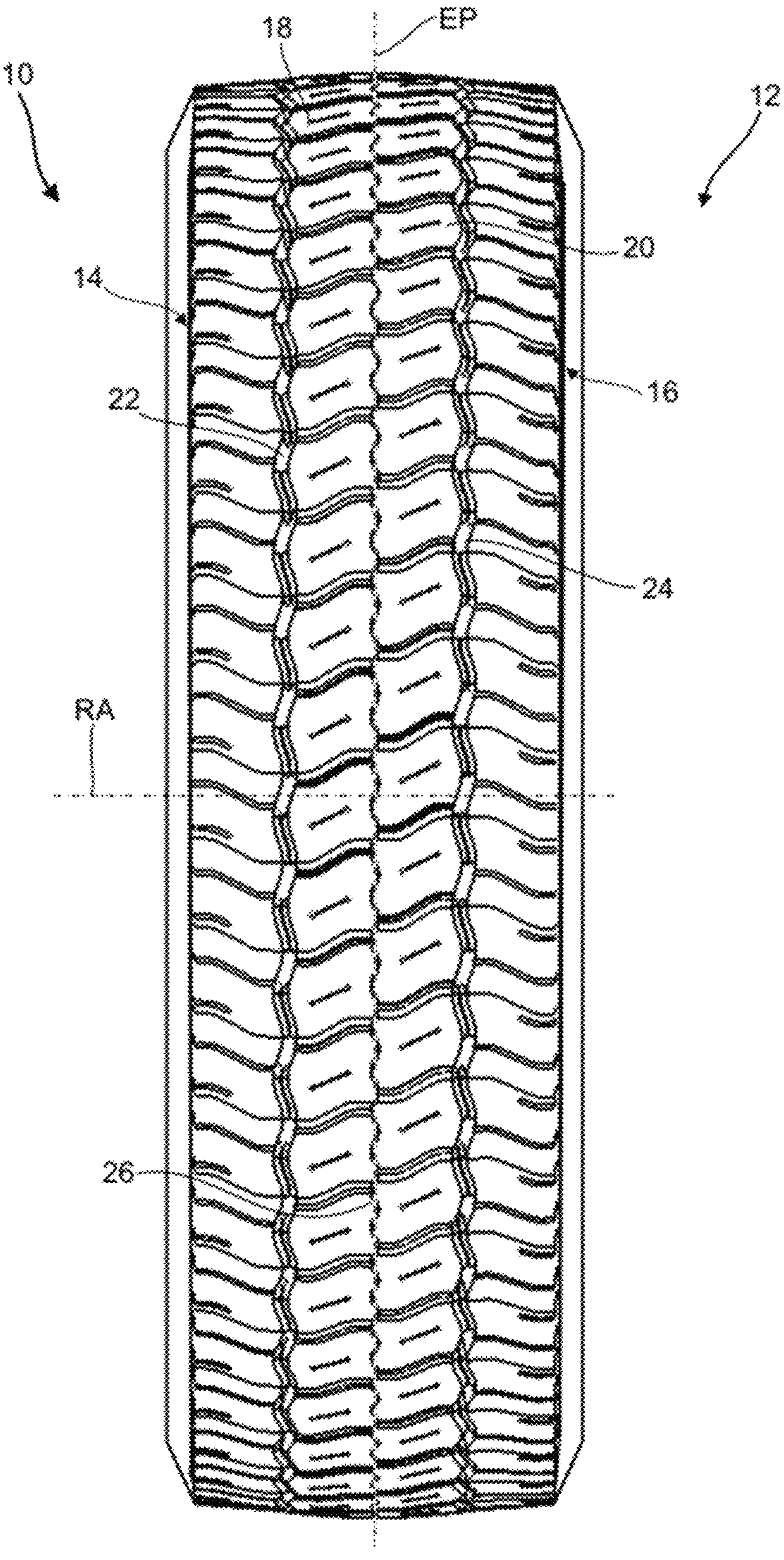
FIG. 2 is a front view of a tire with a tire tread in accordance with the invention.

FIG. 1 and FIG. 2 represent a tire 10 in accordance with the present invention. As an option of the invention, the tire 10 is a pneumatic tire or a non-pneumatic tire. The tire 10 exhibits a tire tread 12. The tire tread 12 forms a circumferential surface around a rotation axis RA of the tire 10. The circumferential surface is intended to engage the ground surface. The tire 10 comprises a carcass, increasing its stiffness.

The tire tread 12 includes two circumferential shoulder ribs (14, 16) on either side of the tire tread 12. The circumferential shoulder ribs (14, 16) are axially opposite with respect to one another. They are the axially outermost circumferential ribs. An equatorial plane EP optionally divides the tire tread 12 into two symmetrical halves. The equatorial plane EP is a geometrical plane. The equatorial plane EP is a centerplane. The equatorial plane EP is perpendicular to the rotation axis RA.

A pair of intermediate circumferential ribs (18, 20) are facing one another. The intermediate circumferential ribs (18, 20) are inboard the circumferential shoulder ribs (14, 16). A pair of circumferential shoulder grooves (22, 24) separates, respectively, the intermediate circumferential ribs (18, 20) from the circumferential shoulder ribs (14, 16). The tire tread 12 is symmetric with respect to the equatorial plane EP. The tire tread 12 optionally comprises a net-to-gross ratio of at least 80%, preferably of at least 90%, more preferably of at least 93%.

A circumferential center groove 26 axially separates the intermediate circumferential ribs (18, 20) from one another. The circumferential center groove 26 exhibits a sinusoidal shape about the rotation axis RA. The circumferential center groove 26 presents waves along an equatorial line. Each of the circumferential shoulder ribs (14, 16) and the intermediate circumferential ribs (18, 20) comprise tread elements. The tread element may be a circumferential tread element defining a closed loop around the rotation axis RA. As an alternative, the tread elements include circumferential rows of discrete tread elements. The tread elements may be block elements.

Figure 3:
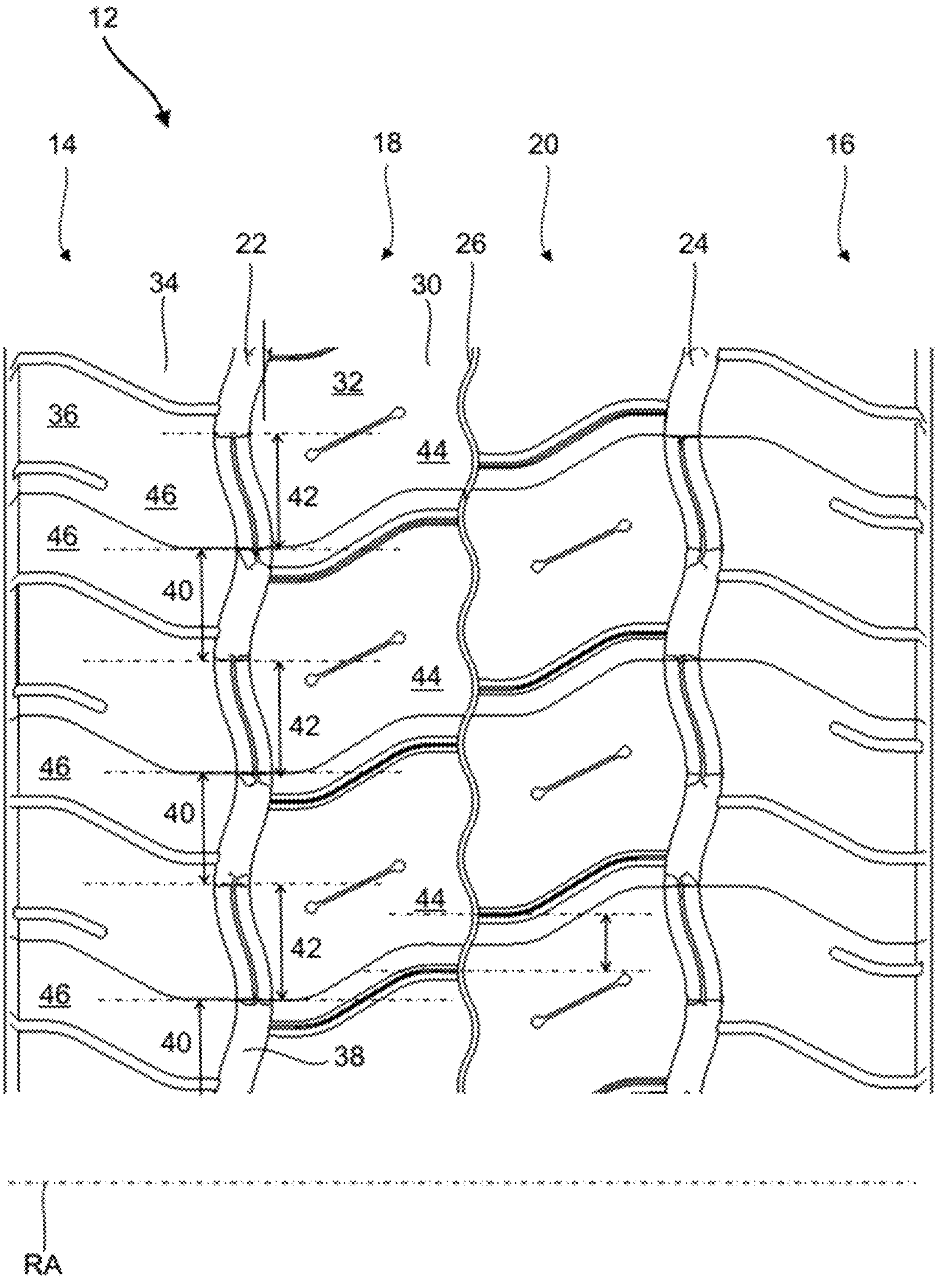
FIG. 3 is a front view of a circumferential portion of a tire tread in accordance with the invention.

FIG. 3 represents an angular portion of a tire tread 12 of a tire in accordance with the invention. The rotation axis RA is represented at an illustrative position for orientation purposes.

The tire tread 12 comprises at least one first tread element 30 with a first radially outermost surface 32 and a second tread element 34 with a second radially outermost surface 36. The tire tread 12 further comprises a groove 38. The groove 38 is between the first tread element 30 and the second tread element 34. This groove 38 comprises a first section 40 and a second section 42.

In the current embodiment, the first tread element 30 and the second tread element 34 are in different circumferential ribs. They are in adjacent circumferential ribs. The first tread element 30 is formed by one of the circumferential shoulder ribs (14, 16); whereas the second tread element 34 is formed by one of the intermediate circumferential ribs (18, 20). The groove 38 is a circumferential groove. The groove 38 is one of the circumferential grooves (22, 24, 26). Preferably, the said groove is formed in each of the circumferential shoulder grooves (22, 24).

As an alternative, the groove 38 is an axial groove. The groove 38 is between two adjacent tread elements of one of the circumferential shoulder ribs (14, 16).

The first section 40 comprises a plurality of first sections 40, also considered as first sub-sections. The second section 42 comprises a plurality of second sections 42, also considered as second sub-sections. The first sections 40 and the second sections 42 define an alternation along a circumferential direction of the tire tread 12. They are alternated about the rotation axis.

The first tread element 30 comprises a circumferential row of first tread blocks 44. The first tread blocks 44 are circumferentially separated from one another. The second tread element 34 comprises a circumferential row of second tread blocks 46. The second tread blocks 46 are circumferentially separated from one another. Each first tread block 44 circumferentially overlaps two second tread blocks 46.

Figure 4:
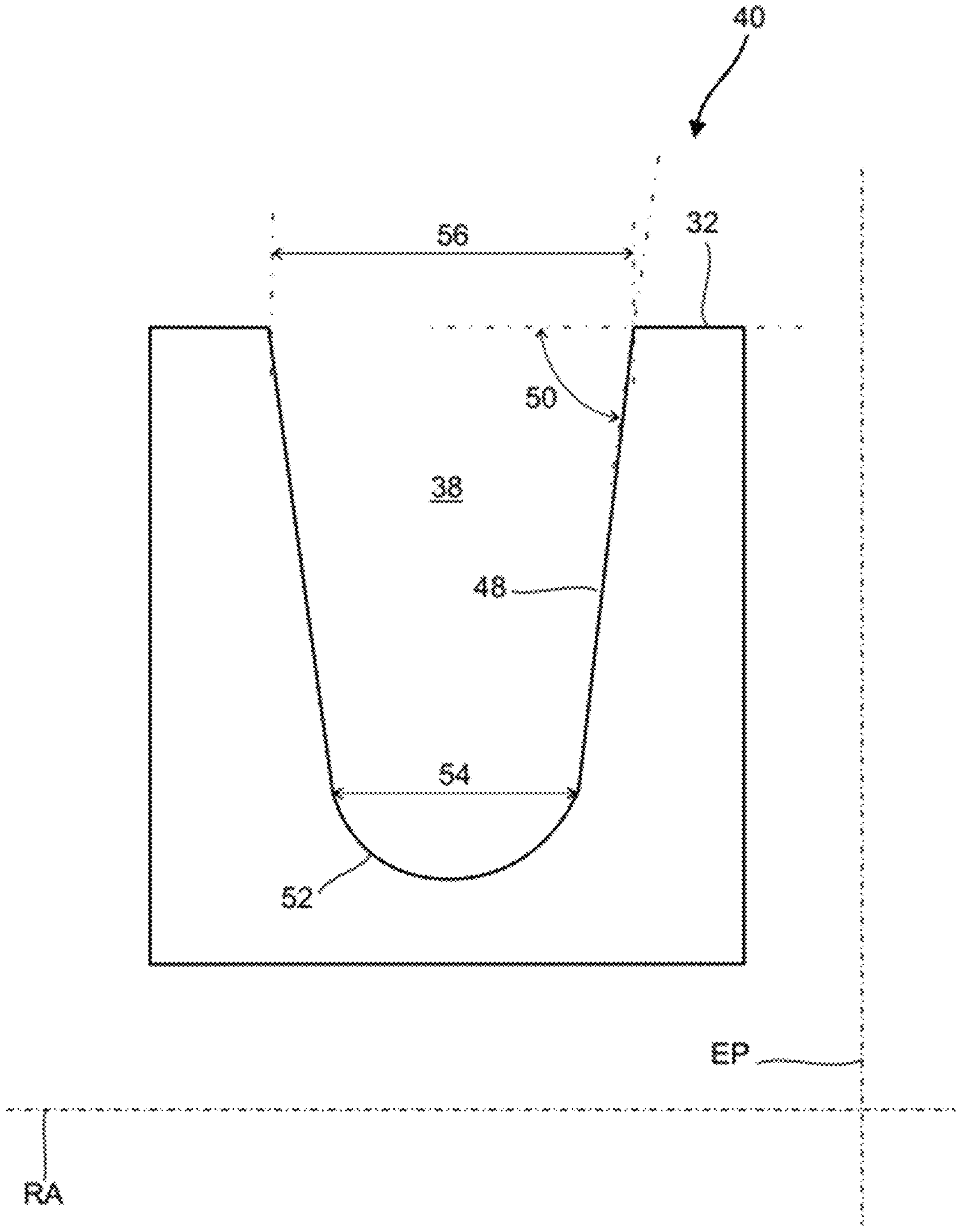
FIG. 4 is a through cut of a first portion of a groove of a tire tread in accordance with the invention.

FIG. 4 represents a first section 40 of a groove 38 of a tire tread in accordance with the invention. The rotation axis RA is represented at an illustrative position for orientation purposes.

The first section 40 of the groove 38 comprises a side surface 48 which extends from the first radially outermost surface 32. The side surface 48 generally exhibits a straight profile. It forms a planar wall. The side surface 48 is inclined with respect to the first radially outermost surface 32 of a first inclination angle 50. The side surface 48 defines the open angle. The side surface 48 is inclined with respect to the equatorial plane EP. The side surface 48 is inclined of at least 5°, preferably of at least 8°; more preferably of at least 15° with respect to the equatorial plane EP. The first inclination angle 50 ranges from 45° to 88°, preferably from 60° to 87°, more preferably from 70° to 85°.

The groove 38 extends along a circumferential direction. The groove 38 comprises a bottom portion 52 joined to the side surface 48; the bottom portion 52 comprises a bottom width 54. The bottom portion 52 exhibits a curly profile. It forms a channel or a half pipe. The bottom width 54 may be a maximum bottom width. The bottom width 54 is measured radially level the interface with the side surface 48. The first section 40 comprises a first maximum width 56 radially level the first radially outermost surface 32. The first maximum width 56 is larger than the bottom width 54.

The current description is detailed with respect to one of the first sections 40 of the tire tread 12. Yet, the present teaching applies to each first section 40, except if the contrary is explicitly mentioned.

As an option of the invention, the profile of first section 40 of the groove 38 is symmetrical.

Figure 5:
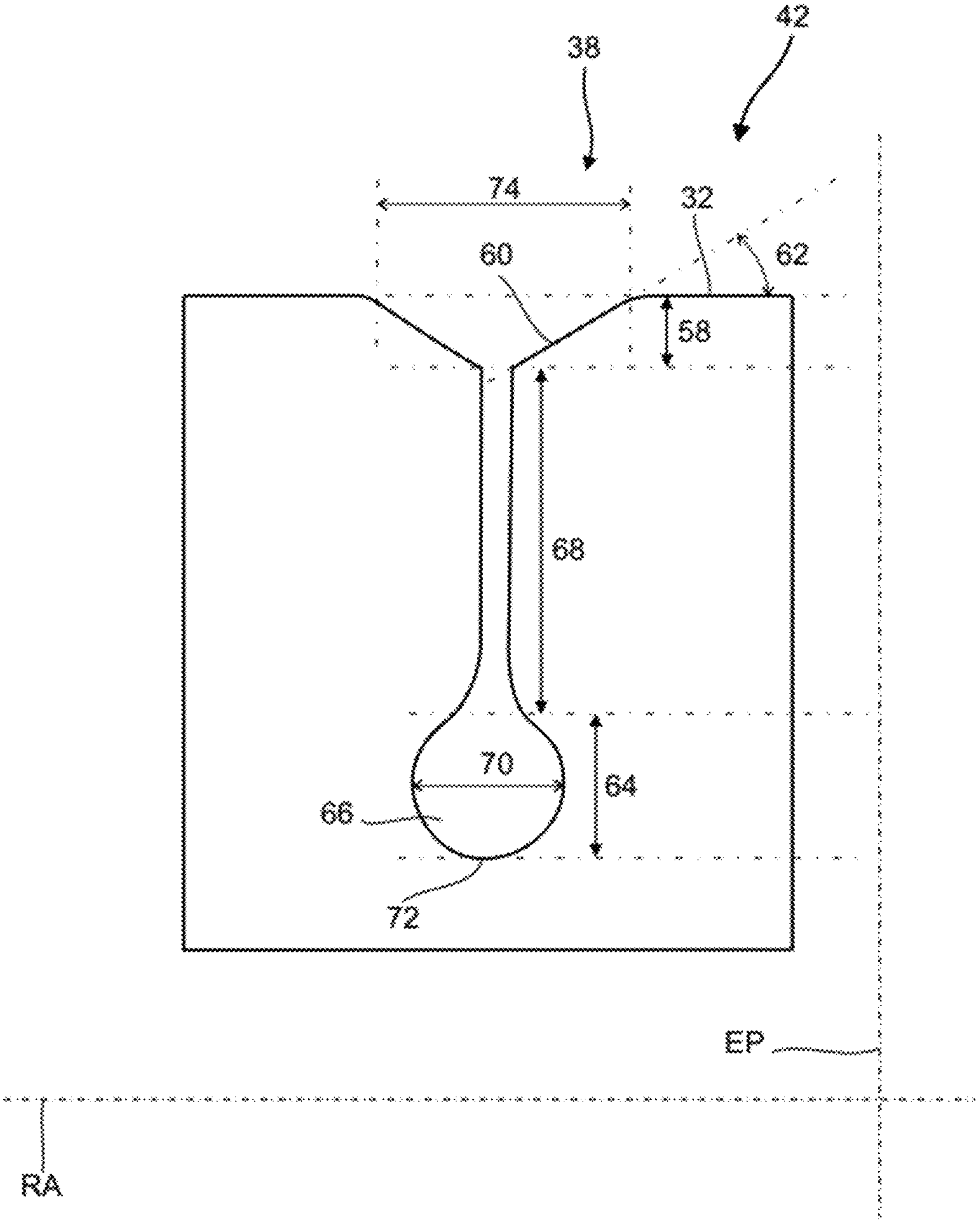
FIG. 5 is a through cut of a second portion of a groove of a tire tread in accordance with the invention.

FIG. 5 represents a second section 42 of a groove 38 of a tire tread in accordance with the invention. The rotation axis RA is represented at an illustrative position for orientation purposes.

The second section 42 comprises a radially outermost portion 58 with an inclined surface 60. The radially outermost portion 58 forms a protrusion within the groove 38. It forms a reinforcing structure. The inclined surface 60 is inclined with respect to the equatorial plane EP. The inclined surface 60 is inclined with respect to the first radially outermost surface 32 of a second inclination angle 62. The second inclination angle 62 is smaller than the first inclination angle, preferably at least twice as small. The second inclination angle 62 ranges from 3° to 45°, preferably from 4° to 35°, more preferably from 5° to 30°.

The second section 42 comprises further comprises a radially innermost portion 64 with a passage 66 extending toward the first section, and a slit portion 68 radially connecting the radially innermost portion 64 to the radially outermost portion 58. The passage 66 comprises a passage width 70. The passage 66 generally exhibits a circular cross-section. It forms a cylindrical duct. The passage 66 comprises a cylindrical shape.

The slit portion 68 is narrower than the passage 66, preferably at least two times narrower, more preferably at least four times narrower. The widths of the slit portion 68 and the passage 66 are maximum widths. The slit portion 68 generally exhibits a constant width. The passage 66 comprises a passage bottom 72. The passage bottom 72 is opposite to the slit portion 68. The second section 42 comprises a second maximum width 74 radially level the first radially outermost surface 32. The widths are measured along the rotation axis RA.

The current description is detailed with respect to one of the second sections 42 of the tire tread 12. Yet, the present teaching applies to each second section 42 of the tire tread 12, except is the contrary is explicitly mentioned.

Figure 6:
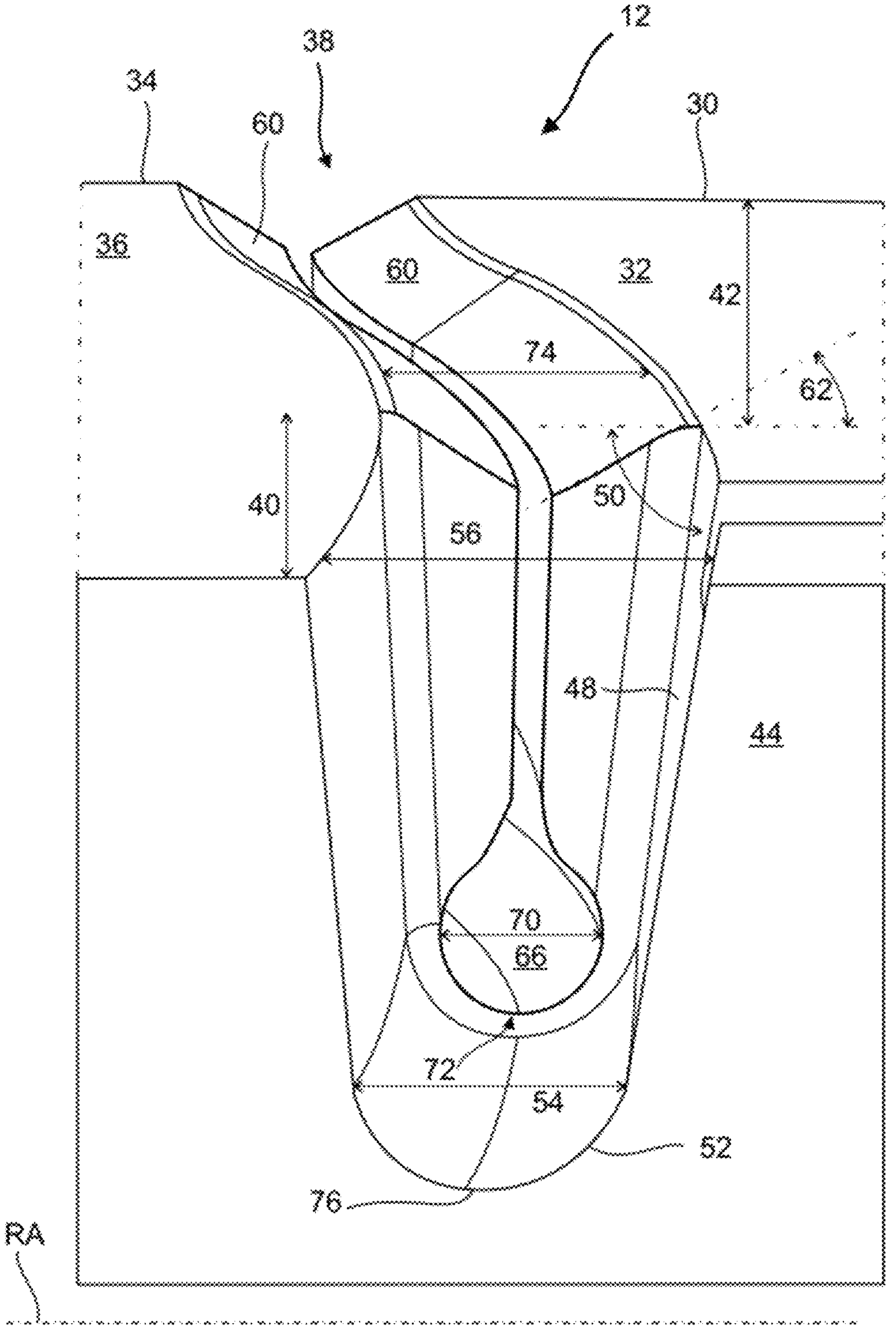
FIG. 6 is a perspective illustration of a groove of a tire tread in accordance with the invention.

FIG. 6 represents a groove 38 of a tire tread 12 in accordance with the invention. The rotation axis RA is represented at an illustrative position for orientation purposes.

Along the first section 40 (partially represented) and the adjacent second section 42, the first radially outermost surface 32 of the first tread element 30 is planar, or generally planar. The first inclination angle 50 and the second inclination angle 62 exhibit an inclination difference ranging from 20° to 80°. Preferably, the inclination difference ranges from 30° to 70°; more preferably from 40° to 60°. Preferably, the inclination difference is of at least 45°.

The groove 38 comprises a bottom portion 52 joined to the side surface 48, the passage comprises 66 a passage bottom 72. The bottom portion 52 extends radially inward the passage bottom 72. The passage bottom 72 is radially separated from the bottom portion 52. The groove 38 comprises a step joining the bottom portion 52 and the passage bottom 72. The step is at least 0.30 mm.

The passage bottom 72 is radially at distance from the bottom portion 52. Preferably, the passage bottom 72 is radially above the bottom point 76 of the bottom portion 52. The bottom point 76 is the closest point of the bottom portion 52 with respect to the rotation axis RA. This aspect promotes the reinforcing character of the second section 42 and the water flow through the first section 40.

The groove 38 comprises a bottom portion 52 joined to the side surface 48. The passage 66 comprises a passage width 70, the bottom portion 52 comprises a bottom width 54 radially level the passage 66. These widths are measured axially, and radially at the same level. They are measured at a same radial distance from the rotation axis RA. The bottom width 54 is wider than the passage width 70. The passage width 70 represents from 120% to 180% of the bottom width 54. This ratio improves the reinforcing aspect of the second section, and optimizes the water flow through the groove 38. The passage 66 comprises a curvature along the main direction of the groove 38.

The first section 40 comprises a first maximum width 56 radially level the first radially outermost surface 32, and the second section 42 comprises a second maximum width 74 radially level the first radially outermost surface 32. The second maximum width 74 is equal to the first maximum width 56. This ensures the continuity in the groove.

The first tread element 30 comprises a circumferential row of first tread blocks 44. At least one of said first tread blocks 44 extends along each of the first section 40 and the second section 42. The first section 40 and the second section 42 are physically linked. They form a couple of joined sections. The first section 40 is inclined with respect to, or diverges from the second section 42.

The second tread element 34 comprises an inclined surface 60 which extends from the second radially outermost surface 36 and which is symmetrical to the inclined surface 60 of the first tread element 30. The groove 38 exhibits a symmetrical configuration. As apparent from the current illustration, the groove 38 presents a curved pathway. The first section 40 and the second section 42 are each curved.

The groove 38 comprises a groove maximum width radially level the first radially outermost surface 32 and the second radially outermost surface 36. The groove maximum width corresponds to the first maximum width 56 of the first section 40. The groove maximum width ranges from 8 mm to 10 mm. This narrow groove design is achieved thanks to the first inclination angle, and the inclination difference which is also involved in the net-to-gross ratio.

In the current embodiment, the groove 38 exhibits a circumferential main direction. As an alternative, the groove exhibits an axial main direction.

As an alternative, the first tread element, the second tread element, and the groove are aligned in a same circumferential shoulder rib.

As an alternative, the first tread element, the second tread element and are aligned in a same intermediate circumferential rib.

Figure 7:
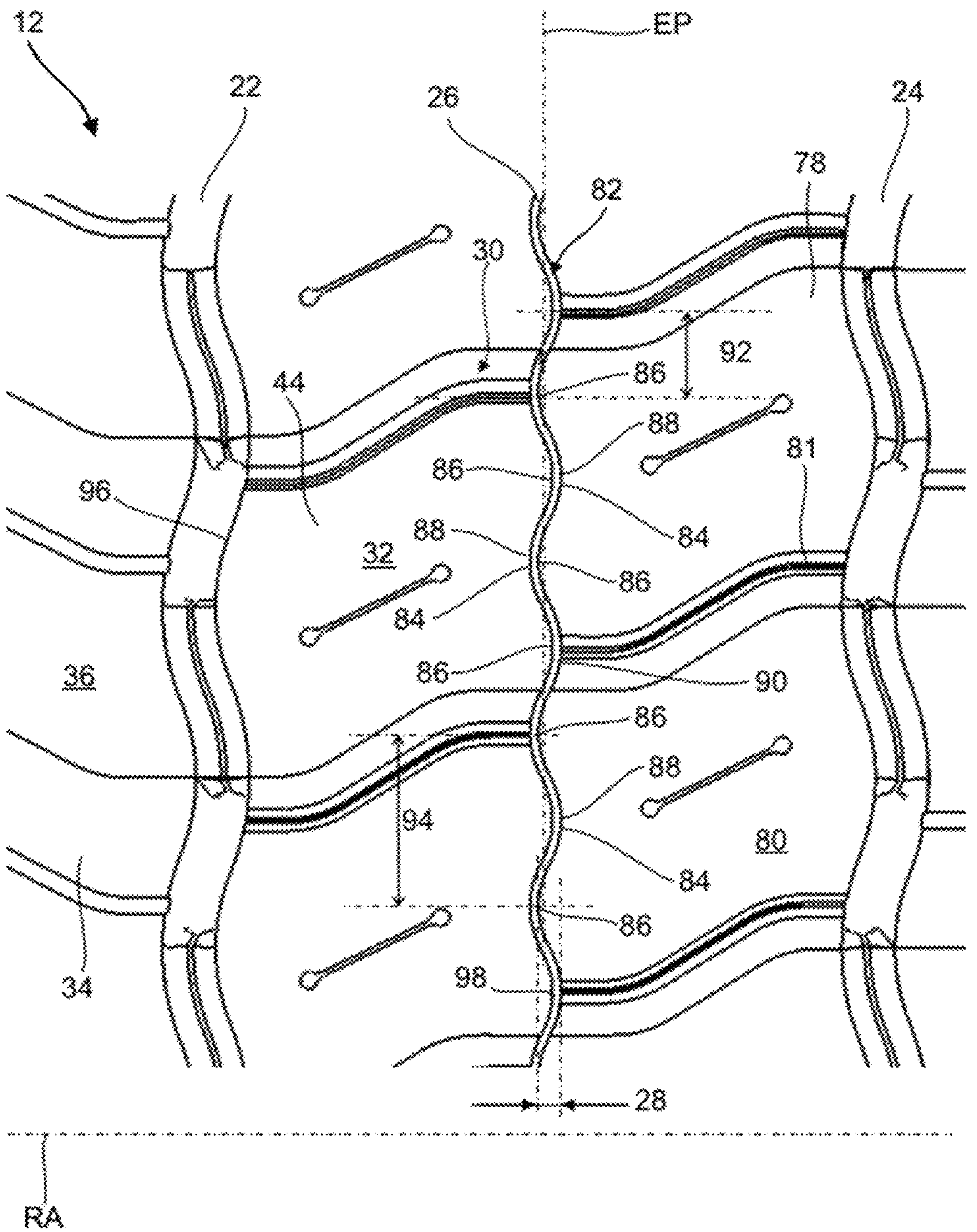
FIG. 7 is an enlarged view of FIG. 3.

FIG. 7 represents a first tread element 30, a second tread element 34, a third tread element 78, and optionally a fourth tread element 80, of a tire tread 12 in accordance with the invention. The rotation axis RA is represented at an illustrative position for orientation purposes.

The tire tread 12 comprises a first tread element 30 with a first radially outermost surface 32, a second tread element 34 with a second radially outermost surface 36, and a third tread element 78 adjacent to the second tread element 34. The first tread element 30 comprises an auxiliary sipe or a center sipe. The second tread element 34 and the third tread element 78 are separated by the circumferential center groove 26. The third tread element 78 and of the fourth tread element 80 are separated by an auxiliary groove 81. The auxiliary groove 81 is narrower than the circumferential shoulder grooves (22, 24).

A circumferential groove 82, such as the circumferential center groove 26, is between the first tread element 30 and the third tread element 78. Each of the first tread element 30 and the third tread element 78 comprises a groove surface 84 demarcating the circumferential groove 82. The groove surfaces 84 are perpendicular to the rotation axis AR. The groove surfaces 84 have undulations. The groove surfaces 84 crosses the equatorial plane EP. They are astride the equatorial plane EP.

Each groove surface 84 comprises two protrusions 86 and a recess 88 between the two protrusions 86. Each protrusion 86 axially extends toward the opposed groove surface 84. One of the two protrusions 86 of the first tread element 30 axially projects within the recess 88 of the third tread element 78. Said protrusion 86 is housed in the recess 88. The protrusions 86 and the recesses 88 form an intermingled interface.

The tire tread 12 comprises a fourth tread element 80 identical to the third tread element 78. Hence, the fourth tread element 80 comprises two protrusions 86 and a recess 88 between the two protrusions 86. The groove surfaces 84 of the third tread element 78 and of the fourth tread element 80 form an interface recess 90. The other of the two protrusions 86 of said first tread element 30 axially projects within said interface recess 90. Hence, said protrusions axially face the third tread element 78 and of the fourth tread element 80.

The third tread element 78 exhibits an element offset 92 with respect to the first tread element 30, and a protrusion offset 94 between the two protrusions 86. These two protrusions 86 are circumferentially adjacent protrusions 86. The element offset 92 is smaller than the pitch. The protrusion offset 94 is at least twice as long as the element offset 92. This aspect fosters the nested character of the first tread element 30 and the third tread element 78.

The circumferential groove 82 is an equatorial circumferential groove. The equatorial circumferential groove is centered on the equatorial plane EP. The equatorial circumferential groove is axially between the first groove and the third groove, preferably between the circumferential shoulder grooves (22, 24). Each of the first tread element 30 and the third tread element 78 touches the equatorial plane EP, notably with their protrusions 86. The protrusions 86 cross the equatorial plane EP.

The first tread element 30 comprises an opposite surface 96 which is axially opposite to the groove surface 84. The opposite surface 96 faces the second tread element 34. The opposite surface 96 demarcates the corresponding circumferential shoulder groove 22. The opposite surface 96 comprises a first protrusion number. The groove surface 84 of the first tread element 30 comprises a second protrusion number which is at least twice as high as the first protrusion number. The second protrusion number improves traction.

The circumferential groove 82 comprises a groove axial width 98. The groove axial width 98 is measured axially between the groove surface 84. The protrusions 86 of the third tread element 78 comprise a protrusion axial width 28. The protrusion axial width 28 is measured axially from the tip of the protrusions 86 to the axial end of the recess 88. The protrusion axial width 28 is larger than the groove axial width 98. This aspect extends the road contact surface, and then grip.

Figure 8:
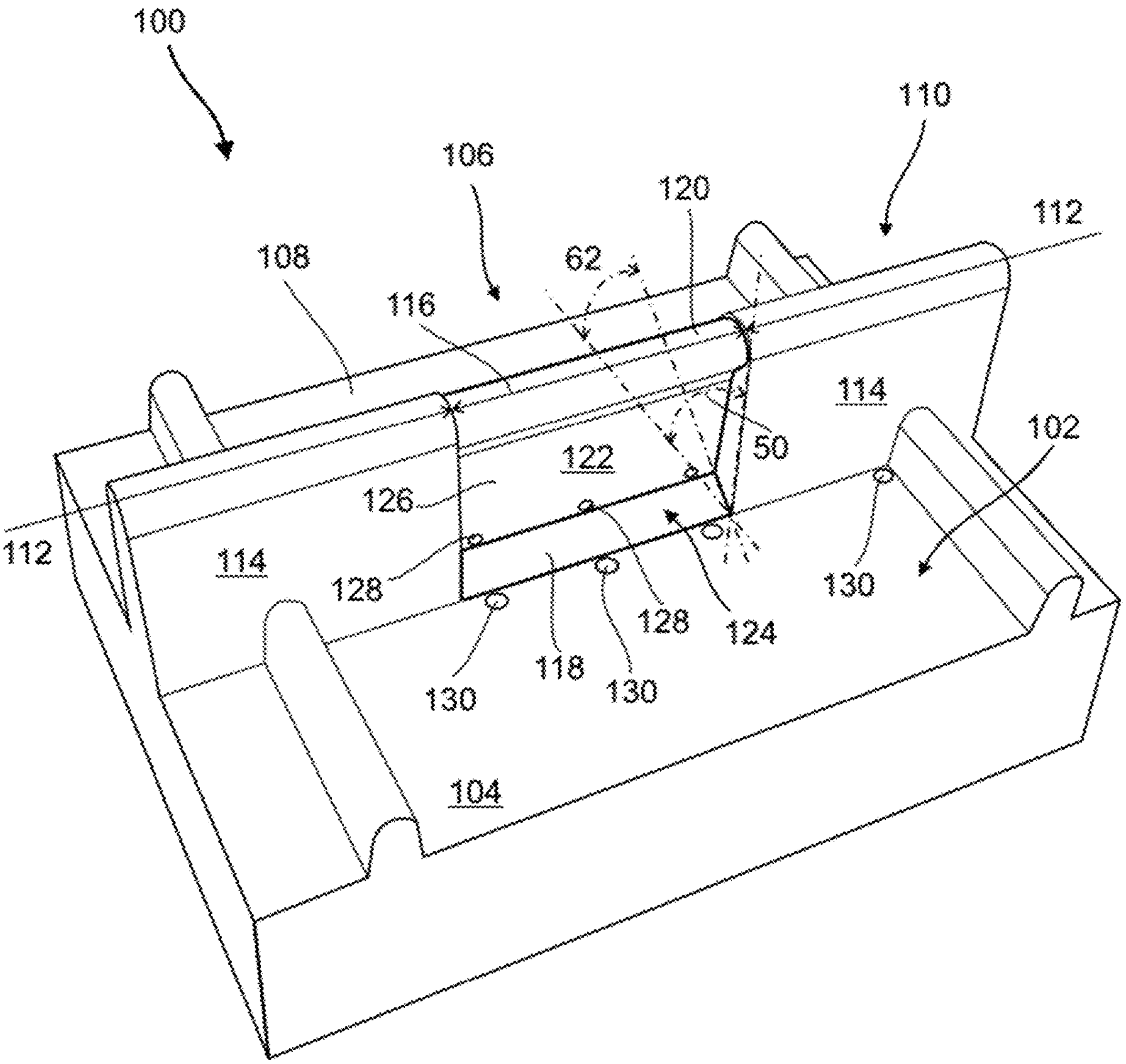
FIG. 8 is a perspective illustration of a tire tread mold in accordance with the invention.

FIG. 8 represents a tire tread mold 100 in accordance with the invention. Only a portion of said tire tread mold 100 is represented. The tire tread mold 100 enables molding of a tire tread in accordance with FIG. 1 to FIG. 7.

The tire tread mold 100 comprises a first cavity 102 with a first radially outermost surface 104 adapted for molding a first tread element of a tire; a second cavity 106 with a second radially outermost surface 108 for molding a second tread element of said tire. The first radially outermost surface 104 is adapted for forming the first radially outermost surface of the first tread element, and the second radially outermost surface 108 is adapted for forming the second radially outermost surface of the second tread element.

The tire tread mold 100 includes a main separation wall 110 between the first cavity 102 and the second cavity 106 for forming a groove between the first tread element and the second tread element. The main separation wall 110 comprises at least one first mold section 112 with a mold side surface 114 which extends from the first radially outermost surface 104. The mold side surface 114 is inclined with respect to the first radially outermost surface 104 of a first inclination angle 50, which corresponds to the first inclination angle of the first tread element. The first cavity 102 and the second cavity 106 are bordered by fences 132. The fences 132 protrude from the first radially outermost surface 104 and the first radially outermost surface 104. They extend from the main separation wall 110.

The tire tread mold 100 further includes at least one second mold section 116. The second mold section 116 is between two first mold sections 112. The first mold section 112 is higher than the second mold section 116. The second mold section 116 comprises a radially outermost portion with a mold inclined surface 118, which is inclined with respect to the first radially outermost surface 104 of a second inclination angle 62. The second inclination angle 62 ranges from 10° to 45°, preferably from 20° to 35°.

The second inclination angle 62 is narrower than the first inclination angle 50. The first inclination angle 50 and the second inclination angle 62 present an inclination difference ranging from 20° to 80°, preferably from 30° to 70°; more preferably from 40° to 60°. The angle difference optimizes gas exhaust away from the second mold section 116.

The second mold section 116 includes a radially innermost portion 120 with a rod extending toward the first mold section 112, preferably connecting the first mold sections 112. The rod has a complementary shape to the passage of the groove. The second mold section 116 comprises a connecting portion 122 radially connecting the radially innermost portion to the radially outermost portion, said connecting portion 122 being narrower than the rod. The second mold section 116 is thinner than the first mold section 112. Then, it forms a pocket in the main separation wall 110. Such a pocket is subject to gas trapping.

The tire tread mold 100 comprises a separating blade 124 forming the second mold section 116. The separating blade 124 comprises a cylindrical portion forming the radially innermost portion 120 and a partition wall 126 with at least one vent 128. Said vent 128 is an axial vent. The partition wall 126 forms the connecting portion 122. The vent 128 is an air vent. The vent 128 is radially at the opposite of the cylindrical portion, or more generally radially at the opposite of the radially innermost portion 120. The at least one vent 128 forms a vent row. Each vent 128 is level with the mold inclined surface 118. Each vent 128 comes up to the mold inclined surface 118. Then, during injection, air trapped along the second mold section 116 flows across the connecting portion 122. This avoids surface defects.

The first radially outermost surface 104 comprises at least one radial vent 130. The radial vents 130 are along the main separation wall 110. The separating blade 124 comprises a blade vent inclined with respect to the radial vent 130. The blade vents may correspond to the vents 128. The radial vent 130 comprises a first diameter. The blade vent comprises a second diameter which is narrower than the first diameter. The blade vent is at least three times smaller than the radial vent 130.

During tire injection, air trapped along the flows across the radial vent 130. This ensures molding quality.

The first radially outermost surface 104 comprises a first vent density along the mold inclined surface 118 and a second vent density at distance from the mold inclined surface 118. The second vent density is smaller than the first vent density. The first radially outermost surface 104 comprises a first vent gap along the mold inclined surface 118, and a second vent gap at distance from the mold inclined surface 118. The second vent gap is smaller than the first vent gap. The vent gaps are average vent gaps. They are measured between adjacent gaps. The radial vent 130 are closed to one another along the second mold section 116. This promotes air discharge which is relevant for respecting the complex geometry of the second mold section 116.

The mold inclined surface 118 is airtight. The mold inclined surface 118 extends from the vents 128 to the radial vent 130.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire tread comprising:

a first tread element with a first radially outermost surface, a second tread element with a second radially outermost surface, said first groove between the first tread element and the second tread element, said first groove comprising a first section and a second section;

wherein the first section comprises a side surface which extends from the first radially outermost surface and which is inclined with respect to the first radially outermost surface of a first inclination angle, wherein a curved bottom portion is joined to the side surface; and wherein the second section comprises:

i. a radially outermost portion with an inclined surface, which is inclined with respect to the first radially outermost surface of a second inclination angle, which is less than the first inclination angle, the first inclination angle and the second inclination angle exhibiting an inclination difference ranging from 20° to 80°;

ii. a radially innermost portion with a passage extending toward the first section, wherein the passage has a circular cross-sectional shape;

iii. a slit portion radially connecting the radially innermost portion to the radially outermost portion, said slit portion having a width less than the passage;

a third tread element, and a circumferential groove between the first tread element and the third tread element, each of the first tread element and the third tread element comprises a groove surface demarcating the circumferential groove, each groove surface comprising two protrusions and a recess between the two protrusions, one of the two protrusions of the first tread element axially projecting within the recess of the third tread element.

2. The tire tread of claim 1, wherein the inclination difference ranges from 45° to 70° and the second inclination angle ranges from 5° to 30°.

3. The tire tread of claim 1, wherein the first groove comprises a bottom portion joined to the side surface, the passage comprises a passage bottom, the bottom portion extending radially inward the passage bottom.

4. The tire tread of claim 1, wherein the first groove comprises a bottom portion joined to the side surface; the passage comprises a passage width, the bottom portion comprises a bottom width radially level with the passage, said bottom width being wider than the passage width.

5. The tire tread of claim 1, wherein the first section comprises a first maximum width radially level with the first radially outermost surface, and the second section comprises a second maximum width radially level with the first radially outermost surface, the second maximum width is equal to the first maximum width.

6. The tire tread of claim 1, wherein the first tread element comprises a circumferential row of first tread blocks, at least one of said first tread blocks extends along each of the first section and the second section, the second tread element comprises an inclined surface which extends from the second radially outermost surface and which is symmetrical to the inclined surface of the first tread element.

7. The tire tread of claim 1, wherein the first groove comprises a groove maximum width radially level the first radially outermost surface and the second radially outermost surface, said groove maximum width ranges from 8 mm to 10 mm, and the passage comprises a cylindrical shape.

8. A tire tread comprising:

a. a first tread element with a first radially outermost surface;

b. a second tread element;

c. a third tread element;

d. a first groove between the first tread element and the second tread element, said first groove comprising a first section and a second section;

e. the first section comprises a side surface which is inclined with respect to the first radially outermost surface of a first inclination angle; wherein a curved bottom portion is joined to the side surface;

f. the second section comprises:

i. a radially outermost portion with an inclined surface, which is inclined with respect to the first radially outermost surface of a second inclination angle, which is less than the first inclination angle, the first inclination angle and the second inclination angle exhibiting an inclination difference ranging from 20° to 80°;

ii. a radially innermost portion with a passage extending toward the first section, wherein the passage has a circular cross-sectional shape;

iii. a slit portion radially connecting the radially innermost portion to the radially outermost portion, said slit portion being narrower than the passage;

g. a circumferential groove between the first tread element and the third tread element, the circumferential groove comprising first bends and second bends forming an alternation;

each of the first tread element and the third tread element comprises a groove surface demarcating the circumferential groove, each groove surface comprising two protrusions and a recess between the two protrusions, one of the two protrusions of the first tread element axially projecting within the recess of the third tread element.

9. The tire tread of claim 8, wherein the tire tread comprises a fourth tread element identical to the third tread element, the groove surfaces of the third tread element and the fourth tread element form an interface recess, the other of the two protrusions of said first tread element axially projecting within said interface recess.

10. The tire tread of claim 8, wherein the third tread element comprises an element offset with respect to the first tread element, and a protrusion offset between the two protrusions, said protrusion offset being twice as long as the element offset.

11. The tire tread of claim 8, wherein the circumferential groove is an equatorial circumferential groove, the tire tread further comprising a third groove; the equatorial circumferential groove being axially between the first groove and the third groove.

12. The tire tread of claim 8, wherein the first tread element comprises an opposite surface axially opposite to the groove surface, the opposite surface comprises a first protrusion number, and the groove surface comprises a second protrusion number which is at least twice as high than the first protrusion number.

13. The tire tread of claim 8, wherein the circumferential groove comprises a groove axial width, and the two protrusions comprise a protrusion axial width which is larger than the groove axial width.

* * * * *